Figures 1, 2:
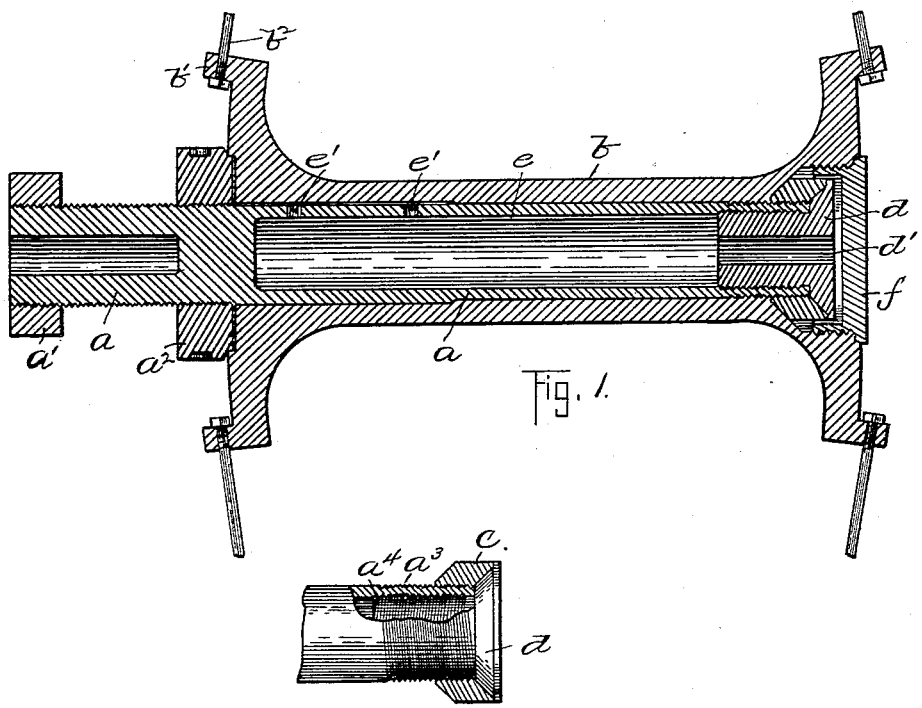

No. 623,277. Patented Apr. 18, 1899.
G. H. CLARK.
HUB AND AXLE.
(Application filed Sept. 21, 1898.)

(No Model.)

Witnesses:
H. B. Davis.
J. L. Hutchinson

Inventor:
George H. Clark,
by B. J. Hayes
Atty

UNITED STATES PATENT OFFICE.

GEORGE H. CLARK, OF BOSTON, MASSACHUSETTS.

HUB AND AXLE.

SPECIFICATION forming part of Letters Patent No. 623,277, dated April 18, 1899.

Application filed September 21, 1898. Serial No. 691,484. (No model.)

*To all whom it may concern:*

Be it known that I, GEORGE H. CLARK, of Boston, county of Suffolk, State of Massachusetts, have invented an Improvement in Hubs and Axles, of which the following description, in connection with the accompanying drawings, is a specification, like letters on the drawings representing like parts.

This invention has for its object to improve the construction of hubs and axles, to the end that the hub may be securely held on the axle, and also a reservoir provided which is adapted to be filled with a lubricant for lubricating the axle.

In accordance with this invention the axle upon which the wheel-hub is mounted has formed at one end an external and an internal screw-threaded portion, one of said screw-threads being made right and the other left, and a collar is screwed onto the axle, which bears against the hub, and a nut is screwed into the axle, turning in a direction opposite the collar, which bears against said collar, holding it fast in whatever position it may be set. The axle has a pair of nuts mounted on it near the opposite end, between which the frame is placed, and the wheel-hub will abut against one of said nuts. The axle thus secured to the frame serves as and constitutes a stub-axle. The axle is made hollow to receive a suitable supply of lubricant and has lateral exits by which the lubricant is delivered as may be required, and the nut, which is screwed into the end of the hollow axle, has a hole through it communicating with the interior of the axle, through which the lubricant is injected, and a cap is secured to the hub outside of and inclosing said nut.

Figure 1 shows in longitudinal section an axle and wheel-hub embodying this invention, and Fig. 2 a detail of the locking-nut on the axle.

The axle $a$, of any suitable length, has mounted upon it a wheel-hub $b$. On one end of the axle $a$ a pair of nuts $a'$ $a^2$ are mounted, between which the frame is placed, and the wheel-hub $b$ abuts against the nut $a^2$, a washer being interposed, if desired. The axle $a$ has at its opposite end an externally-screw-threaded portion $a^3$ and an internally-screw-threaded portion $a^4$, the threads being made right and left, respectively, and a collar $c$ is turned onto the externally-screw-threaded portion $a^3$, which bears against the interior of the wheel-hub and holds said hub in position against the nut $a^2$, and a nut $d$ is screwed into the axle, turning in a direction opposite the collar $c$, the head of said nut bearing against the collar $c$, and thereby holding said collar fast in whatever position it may be set.
The axle is herein shown as made hollow, as at $e$, to receive a supply of lubricant and is formed or provided with a number of exits $e'$, through which the lubricant escapes. The locking-nut $d$ has a hole through it by which the lubricant may be supplied to the hollow axle as may be required. A cap $f$ is screwed into the end of the hub outside of the locking-nut $d$, which conceals the latter and prevents the escape of the lubricant.
The hub $b$ is herein represented as having flanges $b'$ at each end, which are adapted to receive the ends of the spokes $b^2$.

By the construction herein shown and described it will be seen that the hub is securely held in place and is lubricated, that the wheel may be readily removed, and that the lubricant may be supplied without removing the wheel.

While I have herein represented the axle as a stub-axle, I do not desire to limit my invention to such kind of an axle.

I claim—

1. An axle, a pair of nuts mounted on one end thereof which receive between them the frame, a hub mounted on said axle abutting against one of said nuts, a collar screwed onto said axle bearing against said hub, a nut screwed into said axle turning in a direction opposite the collar having a head bearing against said collar, substantially as described.

2. A hollow axle having lateral exits, a hub mounted thereon, a collar screwed onto said axle bearing against said hub, a nut screwed into said axle turning in a direction opposite the collar and having a head bearing against said collar and also having a hole through it communicating with the interior of the axle and a cap concealing said nut, substantially as described.

In testimony whereof I have signed my name to this specification in the presence of two subscribing witnesses.

GEORGE H. CLARK.

Witnesses:
B. J. NOYES,
JENNIE L. HUTCHINSON.